(12) United States Patent
Miehls et al.

(10) Patent No.: US 6,358,462 B1
(45) Date of Patent: Mar. 19, 2002

(54) METHOD OF MANUFACTURING A LIQUID COOLED BLOW MOLDED ARTICLE

(75) Inventors: Brad Alan Miehls, Holland, OH (US); Bradley Allen Silvius, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/301,233

(22) Filed: Apr. 28, 1999

(51) Int. Cl.⁷ ............................................... B29C 49/64
(52) U.S. Cl. ...................... 264/526; 264/528; 425/526; 425/536
(58) Field of Search .................... 264/526, 528, 264/540, 529; 425/526, 536

(56) References Cited

U.S. PATENT DOCUMENTS

| | | | |
|---|---|---|---|
| 3,694,424 A | * 9/1972 | Hunkar et al. | 264/528 |
| 3,910,746 A | * 10/1975 | Mrusek et al. | 425/526 |
| 3,937,610 A | 2/1976 | Farrell | |
| 5,229,043 A | * 7/1993 | Lee | 264/37 |
| 5,498,390 A | 3/1996 | Sterzel | |

FOREIGN PATENT DOCUMENTS

| | | |
|---|---|---|
| EP | 0908292 A1 | 5/1997 |
| JP | 02-063719 | 8/1988 |
| JP | 05-023094 | 2/1993 |
| JP | 05-104616 | 4/1993 |
| JP | 9150449 A | 9/1995 |
| JP | 9239819 A | 9/1997 |

* cited by examiner

Primary Examiner—Suzanne E. McDowell
(74) Attorney, Agent, or Firm—Steven L. Oberholtzer; Brinks Hofer Gilson & Lione

(57) ABSTRACT

A method of blow molding a plastic article. A plastic article is blow molded within a mold. The article has plastic parison a wall. The wall is pierced by a first and a second needle or blowing pin. The wall forms a fluid-tight connection between the first needle and the parison wall. A volume of cooling liquid is injected into the article through the first needle. The cooling liquid cools the interior wall. Gas is vented from within the article through the second needle while the cooling liquid is injected into the article. The cooling liquid is evacuated through the first needle after the interior wall is cooled sufficiently to be removed from the mold.

12 Claims, 3 Drawing Sheets

METHOD OF MANUFACTURING A LIQUID COOLED BLOW MOLDED ARTICLE

BACKGROUND OF THE INVENTION

1. Field of the Invention

The present invention is directed to a method of cooling blow molded plastic articles by injecting a liquid into the interior of the freshly molded article. More specifically, the invention relates to a method of blow molding an article and subsequently cooling the molded article by injecting a liquid into the interior portion of the article and then applying a positive gas pressure to remove the liquid from the interior of the article.

2. Description of the Related Art

U.S. Pat. No. 3,937,610 ('610) teaches a method of cooling the interior of a blow molded article with a liquid mist. The '610 patent is directed to a method for reducing the cycle time of molding a blown article by reducing the time needed to cool the article before it can be removed from the mold. After the article is blown, small globules of liquid are circulated through the interior of the article. The liquid evaporates when it contacts the hot plastic wall, thus reducing the temperature of the blown article. Air is circulated within the article to evaporate any remaining liquid. A volume of cooling liquid is not circulated within the interior of the article. Only small liquid globules suspended within the mist contact the article walls. While the method described in the '610 patent reduces the time needed to cool the article, the cycle time reduction is not as great as in the present invention. The liquid globules suspended within the mist do not have sufficient capacity to rapidly cool thick-walled blow molded articles when compared to a solid liquid medium.

Two additional references which also teach including liquid within the blowing medium are U.S. Pat. No. 5,498,390 and Japanese Patent Application No. 05-023094. These references similarly require that the cooling liquid be suspended within the blowing medium and evaporate upon contact with the hot parison walls. While this method of manufacturing blow molded articles reduces the cycle time when compared with ambient cooling, it does not provide the rapid cooling of the present invention due to the superior ability of liquid water to remove heat energy.

Japanese Patent Application No. 05-104616 ('616) teaches a method of making a container by blow molding. After the container has been blow molded, a cooling liquid is introduced into the interior of the molded article. This is known as "water casting" where a quantity of cooling liquid equal to the volume of the container is introduced and held within the article. The amount of heat removed from the article is limited by the volume of water. In the present invention, the cooling liquid is circulated through the article and more than the container volume of cooling liquid may be circulated through the article to remove more heat. The present invention also introduces a constant "in-out" flow of water, creating turbulence. Turbulent flow inside the article provides the greater thermal cooling.

The '616 patent application teaches a method of molding a container around a blowing mandrel. The parison seals between the outer perimeter of the water inlet and the mold to form a fluid-tight seal. Sealing between the parison and the water inlet system has been a key impediment for using liquid cooling for blow molding. Most mold applications do not support the use of a mandrel between the mold walls. In these applications, needle or pin is used to pierce the parison and inject cooling liquid into the molded article. Forming a fluid-tight seal between the parison and the needle is necessary to implement liquid cooling.

The present invention is useful for applications where it is not feasible to place a stationary water inlet between the mold halves. These and other disadvantages of the prior art are overcome by the method taught in the present invention.

SUMMARY OF THE INVENTION

The present invention is directed to a method of blow molding a plastic article. A plastic article is blow molded within a mold. The article has a plastic parison wall. The wall is pierced by a first and a second needle or blowing pin. The wall forms a fluid-tight connection between the first needle and the parison wall. A volume of cooling liquid is injected into the article through the first needle. The cooling liquid cools the interior wall. Gas is vented from within the article through the second needle while the cooling liquid is injected into the article. The cooling liquid is evacuated through the first needle after the interior wall is cooled sufficiently to be removed from the mold.

The invention enables the rapid manufacture of blow molded articles by reducing the dwell time needed within the cavity for the molded article to solidify. The liquid cooling removes heat from the blow molded article faster than cryogenic gases, such as nitrogen or carbon dioxide, and faster than an evaporative mist. The invention enables the use of liquid cooling for articles that cannot be manufactured by placing a water inlet between the mold halves. The use of a blowing pin or needle enables the placement of the water inlet and outlet in the uppermost part location which is often not at the mold parting surface. The needles pierce the parison and form a fluid-tight seal between the needle and the article wall to prevent the cooling liquid or evacuation gas from leaking into the mold.

A combination of valves, pump and accumulator enables the cooling liquid to be quickly flooded into the interior portion of the article and removed by pressurized gas. The first needle is placed at a location that easily enables all of the water within the article to be drained. This usually places the first needle at the lowest portion of the mold. A positive air pressure is introduced through the second needle to force out all of the cooling liquid. The article is removed from the mold with little or no remaining cooling liquid therein.

These and other objects, features, and advantages of the present invention will become more readily apparent when viewed in connection with the accompanying drawings wherein like reference numerals correspond to like components.

DETAILED DESCRIPTION OF THE PREFERRED EMBODIMENTS

Figure 1:
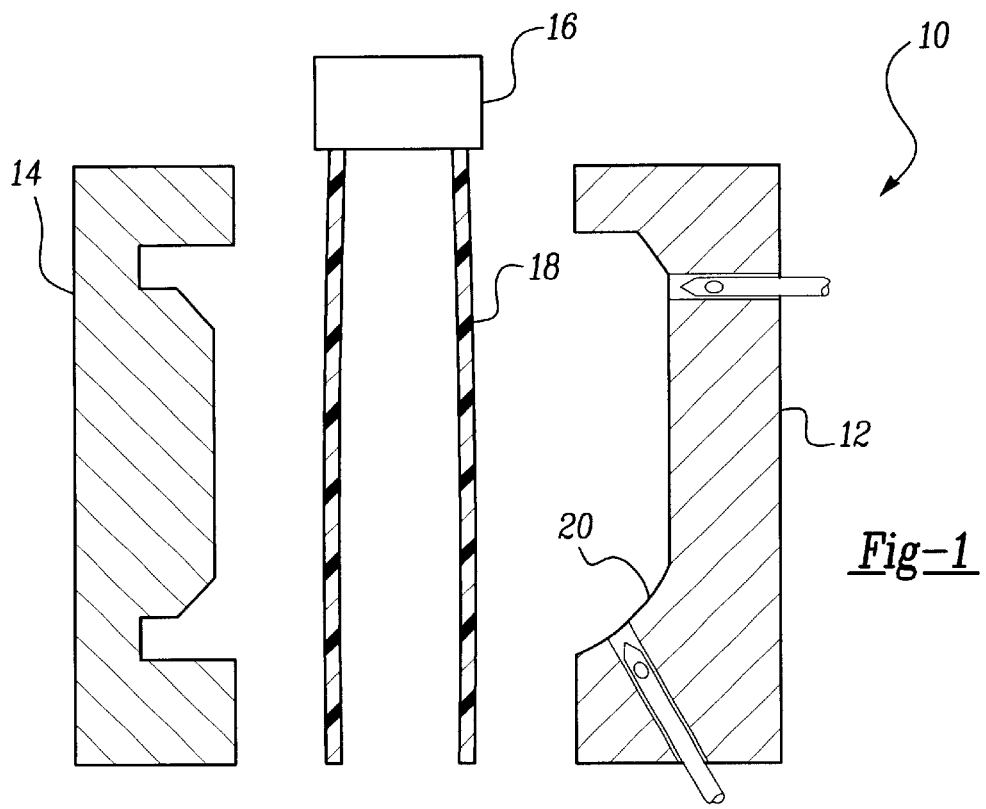
FIGS. 1–4 illustrate cross-sectional views of a blow molding apparatus used in the present invention.

The present invention will be described through a series of drawings, which illustrate the blow molding method claimed. The drawings illustrate a two-piece blow molding apparatus molding an automotive bumper. Other articles may be manufactured using the same or similar equipment and are included within the invention described herein.

The following elements are a word list of the items described in the drawings and are reproduced to aid in understanding the invention.

Figure 2:
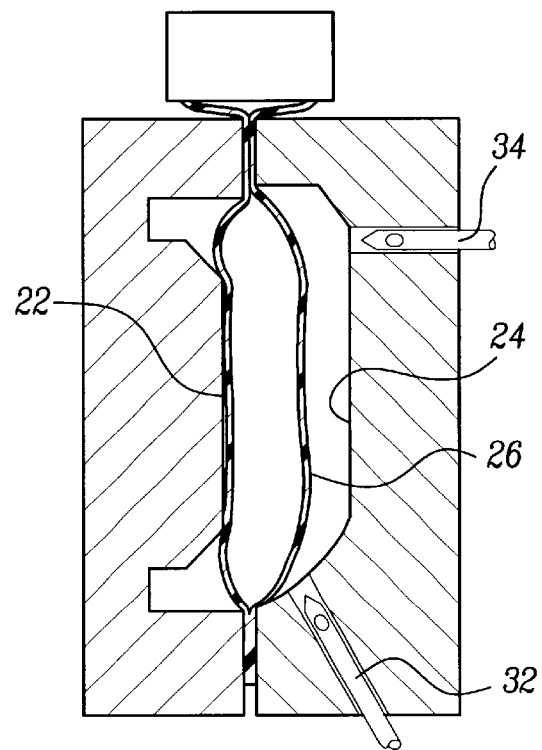

10 blow molding apparatus
12, 14 molds
16 extruder
18 parison
20 mold surface
22 parison wall
24 interior surface
26 exterior surface
32 first needle
34 second needle
36 cooling liquid
38 molded article
40 controller
42 accumulator tank
44 pump
46 three-way valve Illustrated in FIG. 1 is a blow molding apparatus 10. The apparatus 10 includes two opposed mold halves 12, 14. An extruder 16 is positioned between the molds 12, 14 and extrudes a pliable parison 18. The parison 18 may be made from a single or multi-layer extrusion. The invention is particularly well suited for thick walled parisons that have long cooling cycle times. The molds 12, 14 are closed as illustrated in FIG. 2. The closed molds 12, 14 define an interior mold surface 20.

The parison 18 is inflated and conforms to the mold surface 20. The parison 18 includes a parison wall 22. The parison 18 may be inflated through a gas inlet within the extruder 16, or more preferably through the gas needles as will be more fully described below. The parison wall 22 has an interior surface 24 that faces the interior of the parison 18, and an-exterior surface 26 that contacts the mold surface 20.

Figure 3:
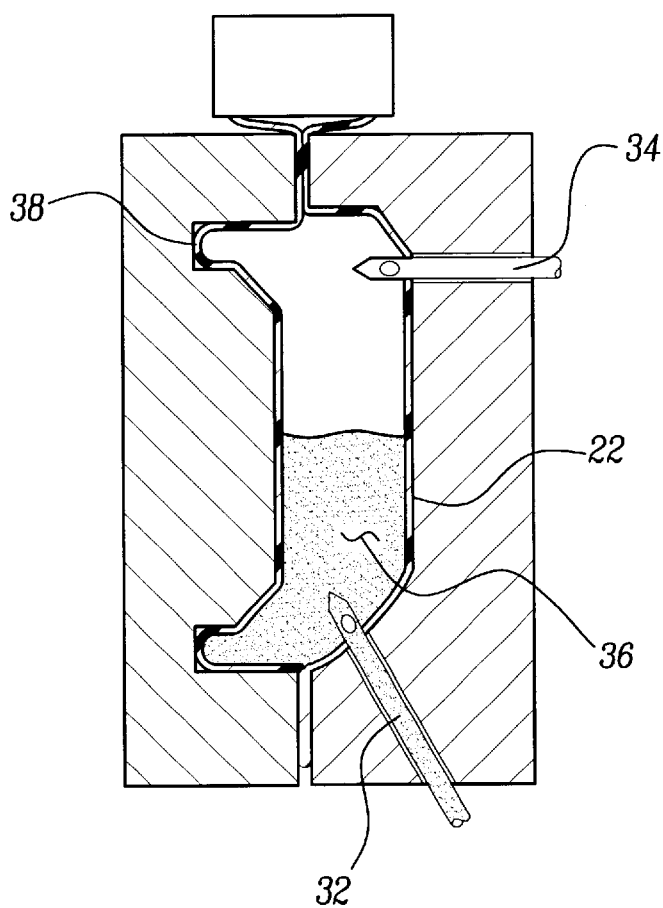
Figure 4:
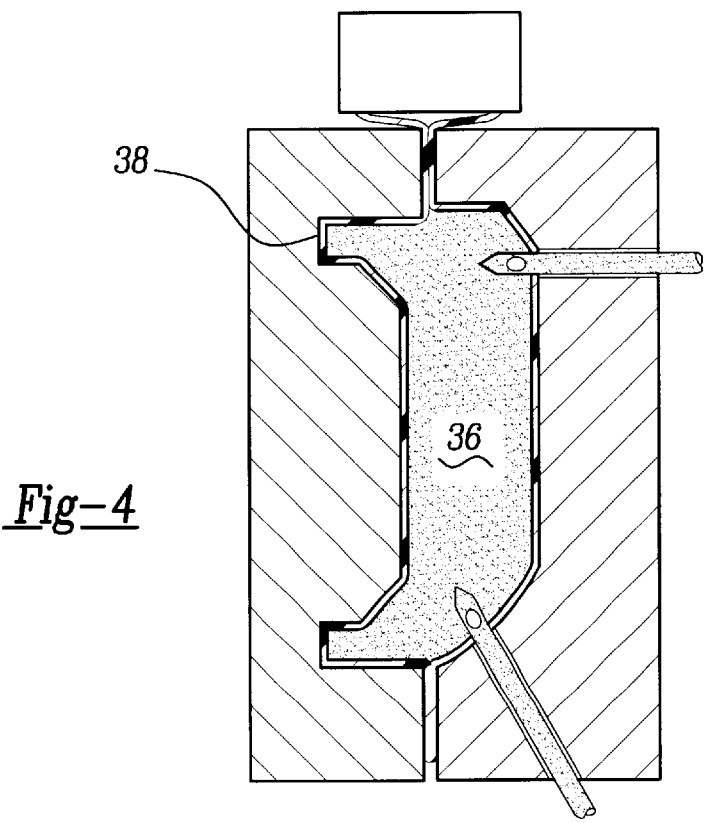
Figure 5:
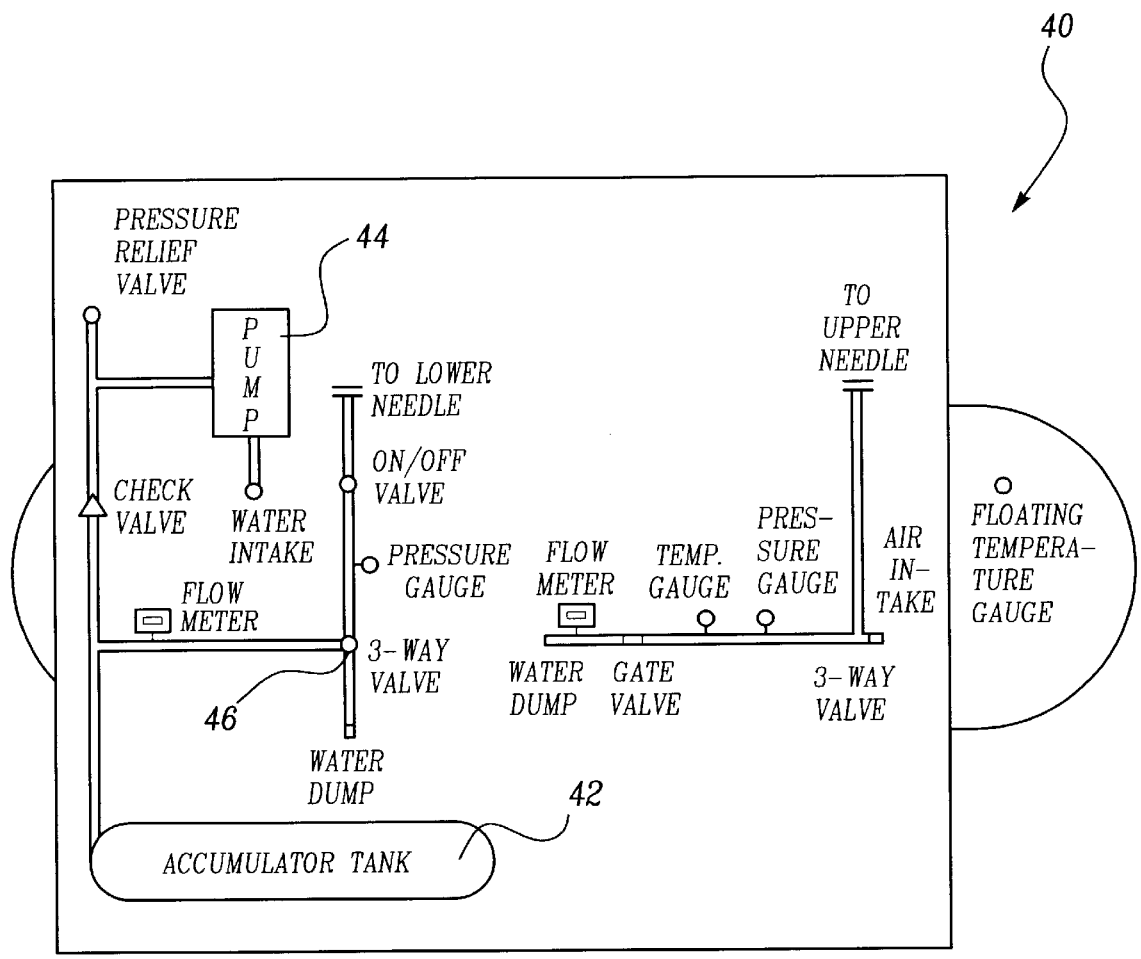
FIG. 5 is a schematic view of the control system that operates the cooling steps.

When molding relatively thick blow molded articles, the parison wall 22 is between 2 mm and 20 mm thick, depending on the application. The parison wall 22 is heated to the given material processing temperature (approx 380° F. for HDPE) and may require 4 to 7 minutes to solidify sufficiently to be removed from the mold under normal cooling processes. To decrease the cycle time of the blow molding apparatus 10, the hot parison wall 22 is cooled, as will be described in FIGS. 3 and 4.

After the parison wall 22 has been fully extruded and the molds 12, 14 closed, a small quantity of air partially inflates the parison 18. A first needle 32 is positioned to slide transversely within the mold 12. The first blowing needle 32 is moved from a retracted position to an extended position. In the extended position, the needle pierces the parison wall 22. A quantity of inflation air is injected through the first needle 32 to cause the parison 18 to conform to the shape of the mold surface 20. The first needle 32 generally pierces the parison wall 22 at the lowermost location of the article to assist in draining the cooling liquid. The lowermost location is selected to enable all of the cooling liquid to drain from within the article. The mold configuration may be rotated so that the lower most location positions the article to have an area that is suitable to accept the blow needle aperture. If the lower most location will become an exposed or visible area of the finished article, then the first needle 32 may pierce a different area of the article that is not the lower most area and use the positive pressure evacuation process described below to drain the cooling liquid.

A second needle 34 generally pierces the parison wall 22 at a uppermost location. The second needle 34 also moves from a retracted to an extended position to pierce the parison wall 22. The first needle 32 is positioned to pierce an area of the article that can accept the blowing needle aperture. The inventors found that sealing between the parison, blowing needles and mold wall is needed to successfully implement the liquid cooling method claimed. The previous attempts of using liquid cooling were unsuccessful because the cooling liquid was able to escape from within the article.

The present invention uses the pliable parison 18 to seal between the mold surface 10, needles 32, 34 and the interior of the molded article. The needles are described in commonly assigned U.S. Pat. No. 6,284,187, titled: "BLOW MOLDING NEEDLE FOR LIQUID COOLING", filed on an even date herewith, and incorporated herein by reference. The needles compress a quality of parison material between the needles and mold to form a fluid tight seal therebetween.

The first and second needles 32, 34 pierce the parison wall 22. A cooling liquid 36 is injected through the first needle 32. The cooling liquid 36 fills the interior of the parison wall 22. The cooling liquid 36 rapidly removes heat from the parison wall 22 and causes the parison 18 to solidify into the molded article 38. As the cooling liquid 36 fills the molded article 38, air trapped within the article 38 is expelled through the second needle 34.

The cooling liquid 36 is circulated through the article 38 until the article has cooled sufficiently to be removed from the molds 12, 14. If very rapid cooling is needed or if very thick-walled articles are molded, the cooling liquid 36 may be continually recirculated through the article. The cooling liquid 36 may be circulated through the article 38 and out the second needle 34. This enables very large quantities of cooling liquid to be circulated through the article. Many times more cooling liquid may be circulated than the article volume. By using a cooling liquid in place of cryogenic cooling, cycle time reductions of over 50% compared to previous cycles were achieved.

After the article 38 has cooled sufficiently to be removed from the molds 12, 14, the cooling liquid 36 is removed from within the article. Based on the article and mold geometry, the cooling liquid may be drained by gravity or positive air pressure through the first needle 32. Because the first needle 32 is positioned at the lowermost portion of the parison wall 22, all of the cooling liquid 36 drains through the first needle 32. The positive pressure can expel the remaining quantify of liquid and also act and an evaporative medium to dry the interior of the article 38. The first and second needles 32, 34 are retracted and the article 38 is removed from the molding apparatus 10.

The cooling liquid may be water. Additionally, other cooling liquids such as alcohols that have a vapor pressure lower than water and evaporate quickly may be used to provide a dry, residue free article.

The molding apparatus 10 is con trolled through a controller 40. The controller 40 includes an accumulator tank 42 that contains a quantity of cooling liquid in excess of the article volume. A pump 44 pressurizes the accumulator with cooling liquid. A valve 46 operated by a PLC controller (not shown) opens to inject cooling liquid to needle 32. Cooling liquid expelled through the second needle 34 enters the controller 40 through a three-way valve 46. If the cooling liquid is water, then the excess cooling liquid is generally flushed down a drain. If the cooling liquid contains expensive non-wetting agents or other items, it may be recirculated through pump 44 through additional valves (not shown). If appropriate liquid pressure is achieved otherwise, the use of an accumulator may not be necessary.

While the best modes for carrying out the invention have been described in detail, those familiar with the art to which this invention relates will recognize various alternative designs and embodiments for practicing the invention as defined by the following claims.

What is claimed:

1. A method of blow-molding a plastic article comprising the steps of:
   - placing a plastic parison within a mold and blow-molding said plastic parison to a plastic article, said article defining an interior parison wall;
   - penetrating said interior parison wall with a first needle and a second needle;
   - wherein said article has a top and a bottom with said bottom located at the lower most portion of said article while said article is in said mold and said first needle pierces the bottom of said article;
   - injecting a volume of cooling liquid into the interior of said article through said first needle, said cooling liquid cooling said interior parison wall;
   - simultaneously venting gas from within said article through said second needle while said cooling liquid is injected into said article; and
   - evacuating said cooling liquid from said first needle after said wall has cooled sufficiently to be removed from said mold.

2. The method of claim 1, wherein said top is at the upper most portion of said article when said article is in said mold and said second needle pierces said top.

3. The method of claim 1 further comprising the steps of injecting a quantity of gas through said second needle to aid in evacuating said cooling liquid through said first needle.

4. The method of claim 3, wherein said gas is under pressure and pushes said liquid through said first needle.

5. The method of claim 1, wherein said cooling liquid is water.

6. The method of claim 1, wherein said cooling liquid contains a non-wetting agent.

7. The method of claim 1, wherein said first needle and said second needle are moved from a retracted position to an extended position to pierce said interior parison wall.

8. The method of claim 7, wherein said first needle and said second needle are moved from said extended position to said retracted position to remove said article from said mold.

9. The method of claim 1, wherein said cooling liquid is circulated through said article and out of said second needle whereby a volume of cooling liquid in excess of the article volume cools said article.

10. A method of blow-molding a plastic article comprising the steps of:
    - extruding a plastic parison within a mold, said parison having an interior and an exterior wall;
    - partially inflating said parison to form an article having a top and a bottom with the bottom located at the lower most portion of the article while said article is in said mold, and with the top located at the top most portion of the article while said article is in said mold;
    - moving a first needle from a retracted to an extended position to pierce said bottom with a first needle;
    - moving a second needle from a retracted to an extended position to pierce said top with said second needle;
    - injecting a volume of cooling liquid in excess of the volume of the article to cause said cooling liquid to circulate through said article and out of said second needle, said cooling liquid cooling said wall;
    - venting gas from within said article through said second needle while said cooling liquid is injected into said article;
    - injecting a quantity of gas through said second needle; and
    - evacuating said cooling liquid under pressure through said first needle after said wall has cooled sufficiently to be removed from said mold.

11. The method of claim 10, wherein said cooling liquid is water.

12. The method of claim 10, wherein said first and second needles are moved from the extended position to the retracted position to remove the article from said mold.

* * * * *